UNITED STATES PATENT OFFICE.

ANDRÉ HELBRONNER AND GASTON EDOUARD CRIQUEBEUF, OF PARIS, FRANCE.

MANUFACTURE OF ESTERS.

1,260,977.  Specification of Letters Patent.  Patented Mar. 26, 1918.

No Drawing. Application filed January 15, 1914, Serial No. 812,327. Renewed January 30, 1918. Serial No. 214,550.

*To all whom it may concern:*

Be it known that we, ANDRÉ HELBRONNER and GASTON EDOUARD CRIQUEBEUF, citizens of the Republic of France, residing at Paris, Seine, 49 Rue St. Georges, have invented a new and useful Improvement in the Manufacture of Esters, of which the following is a specification.

The present invention relates to the commercial production of a solvent rich in methyl acetate or other alkyl acetate. Processes heretofore proposed for the commercial production of methyl acetate have all employed, as starting material, concentrated acetic acid (or the materials from which it is derived) and concentrated methyl alcohol, it being the general idea among chemists that any considerable percentage of water present in the reacting materials would greatly decrease the quantity of methyl acetate which could be produced from given amounts of concentrated acetic acid and methyl alcohol.

In cases where crude pyroligneous acid was to be employed as a starting material, it has been, prior to our invention, the practice first of all to separate (by appropriate means) the acetic acid from the large volume of water to produce concentrated acetic acid, and thereafter to mix such acetic acid in a concentrated state with substantially water-free methyl alcohol and a condensing agent, and to distil the methyl acetate therefrom.

Entirely contrary to such practice, we have found that a substantially quantitative conversion of the acetic acid content of pyroligneous acid into methyl acetate can be produced, by the simple addition, to the pyroligneous acid, of methyl alcohol and a small percentage of a condensing agent, such as sulfuric acid or other strong inorganic acid, followed by distillation.

Such a result is surprising when it is considered that the ordinary crude pyroligneous acid is a liquid containing about 90% of water, the remaining part being chiefly acetic acid. In practice, it has been found moreover that the other substances contained in the pyroligneous acid do not interfere with the reaction.

A further advantage in the use of pyroligneous acid resides in the fact that a part of its normal methyl alcohol content reacts with the acetic acid to form methyl acetate, so that both the acetic acid content and the methyl alcohol content of the pyroligneous acid are utilized. It is accordingly necessary only to supplement the amount of methyl alcohol present, by such a further amount thereof, as is necessary to bring the total methyl alcohol present up to that desired ratio, relative to the acetic acid, corresponding to substantially complete conversion of the acetic acid present into methyl acetate.

The use of an excess of alcohol in esterifying is well known. The detrimental action of water, however, has been recognized as a principle, and for this reason no one has previously tried to work with so dilute a solution as crude pyroligneous acid which, as stated above, contains only a few per cent. of acetic acid at the beginning of the operation, and only a negligible quantity of it at the end of the operation. On the contrary in the process of esterification, it has been hitherto the practice to get rid of water; see Richter, *Organische Chemie*, 2d edition, page 258.

Furthermore, when operating in diluted state no ester of the mineral acid is formed; for instance by using sulfuric acid, there is no production of methyl sulfate, so that the yield of methyl acetate is nearly theoretical.

This new process is of great practical importance because it enables us to effect a direct transformation of aqueous acetic acid very highly diluted (and whose concentration and purification is very expensive) into concentrated methyl acetate.

The present process utilizes an initial raw material which has a low value and contains itself methyl alcohol and acetic acid by transforming it directly into a solvent which can be readily used. This raw material is either the raw pyroligneous acid obtained by carbonizing wood in a closed receptacle, or the pyroligneous acid previously freed from tar or obtained by distilling the crude pyroligneous acid.

Pyroligneous acid already contains some methyl acetate produced in the wood distillation process, but as the distilling point of this liquid and those of some of its impurities, at the beginning of the process of distillation are very near to one another, the obtaining of a purified product by fractional distillation, owing to the smallness of the percentage, is practically impossible.

To obtain methyl acetate from the pyroligneous acid, the following method may be used:—The pyroligneous acid in one of the above mentioned conditions is put into a still, and a portion thereof, say about one-tenth, is distilled over. The distillate obtained during this treatment contains the major part of the aldehyde, acetone and methyl acetate contained in the original pyroligneous acid, together with some methyl alcohol and some water. The heating is then stopped. About 2 to 3% of a strong mineral acid (e. g. $H_2SO_4$) is introduced into the still, and the distillation is continued; during the distillation of about one-third of the remaining liquid the methyl acetate is distilled over. This distillate gives by a simple rectification (if necessary with the addition of a carbonate) a methyl acetate mixed with methyl alcohol and some acetone very suitable for use as a solvent, for cellulose acetate, etc.

If desired, the first partial distillation may be omitted, the condensing agent being directly added to the pyroligneous acid.

It is possible to convert substantially all of the acetic acid of the pyroligneous acid into methyl acetate, by adding methyl alcohol, prior to the esterification, or it is possible to omit the addition of methyl alcohol (other than that contained as an ingredient of the pyroligneous acid) whereby only a part of the acetic acid content of the pyroligneous acid will be converted into methyl-acetate, the remaining portion of pyroligneous acid in the still being subsequently neutralized with an alkali to produce an acetate, (e. g. sodium acetate) as a by-product.

A portion of the pyroligneous acid may be subjected to fractional distillation and subsequent rectification, and that fraction constituting the purest methyl alcohol may be added to the pyroligneous acid from which it is desired to produce methyl acetate, in that modification in which all of the acetic acid content is to be converted into methyl acetate.

The methyl acetate obtained in some instances contains also a small amount of acetone. This is not a disadvantage, since acetone is itself an excellent solvent for cellulose acetates, and for many of the other substances for the dissolving of which the methyl acetate may be employed. The product may also contain some methyl alcohol, which does not interfere with its use as a solvent. The presence of aldehyde would be somewhat objectionable, but since it has a very low boiling point, it is practically all driven off at the commencement of the distillation.

The presence of the condensing agent may cause the formation of pitch from the tar and the resinification of the various impurities. If there results an abundant deposit upon the walls of the receptacle and heating coils, it is only necessary to clean these occasionally.

Finally under these conditions there is produced a product boiling at about 55° C. which will ordinarily contain over two-thirds of its volume of pure methyl acetate, the remainder being composed of methyl alcohol and acetone whose presence is valuable in itself for various reasons.

The aforesaid solvent may be advantageously employed for dissolving nitrocellulose as well as other cellulose esters (acetate, formate, sulfoacetate) which are readily soluble therein even in mixtures which are found in the industry of plastic compounds.

For instance 100 gr. of cellulose acetate shaken with 500 gr. of this solvent quickly and completely dissolves.

Broadly speaking, this liquid may replace acetone in most of its applications (deresinification of rubber, extraction of fats, etc.) It has furthermore the advantage of not being an anesthetic such as chloroform or carbon tetrachlorid, neither does it attack iron as does ethyl acetate. Finally it is more economical and of a lower price than acetone.

Experience has demonstrated the possible utilization of the process for all liquids containing pyroligneous acid, acetic acid or similar organic acids (formic acid, etc.) whatever their dilution. For instance, acids in this condition are found in the residual water of paper mills and the manufacture of alcohol by the cellulose process, in vinegar works and in the waste waters of many industries using commercial acetic acid, in the residues of distilleries, in the manufacture of casein, etc. In all such cases, the separation of the acid from the bulk of water containing it is commercially impossible; on the contrary by forming, within the liquid an esterified component, an easy separation may be accomplished by mere distillation. The choice of the alcohol to be added in order to effect the esterification depends upon the ester which is desired.

Some excess of alcohol, above that theoretically necessary to produce the desired quantity of ester, is always used to effect the substantially complete esterification of the acid. The excess required increases with the increasing dilution of the acid.

It may be pointed out that the process is more efficient when treating large batches of liquid, due to mass action.

What we claim is:

1. A process of producing a solvent which comprises the steps of adding to pyroligneous acid, a condensing agent and maintaining the mass at a temperature capable of effecting the esterification of at least a material portion of the acetic acid content of such pyroligneous acid, while in the presence of the bulk of the water content of such pyroligneous acid.

2. A process which comprises adding methyl alcohol to pyroligneous acid, adding a condensing agent, and thereafter distilling from the mixture an amount of methyl acetate corresponding substantially to the methyl acetate equivalent of the acetic acid content of the pyroligneous acid.

3. A process of producing a solvent which comprises substantially completely esterifying the acetic acid content of pyroligneous acid, while in the presence of the bulk of the water content of such pyroligneous acid.

4. A process of producing a solvent which comprises adding methyl alcohol to pyroligneous acid already containing some methyl alcohol, adding a condensing agent and heating to convert acetic acid and methyl alcohol into methyl acetate, and distilling the latter.

5. A process which comprises adding an alcohol to pyroligneous acid, adding a condensing agent, and thereafter distilling from the mixture an amount of alkyl acetate corresponding substantially to the alkyl acetate equivalent of the acetic acid content of the pyroligneous acid.

6. A process of producing a solvent which comprises adding methyl alcohol to pyroligneous acid, adding a condensing agent, and heating to cause a reaction between the acetic acid and a part of the methyl alcohol content of the pyroligneous acid and of the added methyl alcohol, and distilling the methyl acetate and the excess of methyl alcohol.

7. The process of utilizing the acetic acid content of aqueous liquors containing such acid in a highly diluted state, by separating such acetic acid in the form of an ester, which process comprises adding an alcohol in such a proportion that the resulting liquid contains acetic acid and alcohol in proportions suitable for esterification, subjecting the resulting liquid to heat in the presence of a condensing agent, and distilling the alkyl acetate thereby produced.

8. A process of producing a solvent material, which comprises adding methyl alcohol to pyroligneous acid in such proportions as to produce a mixture containing acetic acid and methyl alcohol in proportions suitable for substantially complete esterification of the acetic acid content of the mixture, such proportions including an excess of methyl alcohol over the quantity theoretically necessary to esterify the entire amount of acetic acid, adding a condensing agent, subjecting the mixture to the temperature necessary to effect esterification and distilling methyl acetate and the excess of methyl alcohol.

9. In the production of a solvent from pyroligneous acid, the improvement which comprises the step of esterifying at least a substantial proportion of the acetic acid content of such pyroligneous acid, such esterification being carried out in the presence of the bulk of the water content of such pyroligneous acid.

10. A process of producing a solvent material, which comprises adding methyl alcohol to pyroligneous acid in such proportions as to produce a mixture containing acetic acid and methyl alcohol in proportions suitable for substantially complete esterification of the acetic acid content of the mixture, such proportions including an excess of methyl alcohol over the quantity theoretically necessary to esterify the entire amount of acetic acid, adding a condensing agent, subjecting the mixture to the temperature necessary to effect esterification, distilling the methyl acetate and the excess of methyl alcohol from the mixture, and thereafter rectifying the distillate.

11. The process of obtaining from pyroligneous acid a liquid rich in methyl acetate which consists in distilling one-tenth of the pyroligneous acid used, adding some mineral acid to the residue, distilling about one-third of the remaining liquid, and collecting it.

12. The process of obtaining from pyroligneous acid a liquid rich in methyl acetate which consists in distilling one-tenth of the pyroligneous acid used, adding some mineral acid and an excess of methyl alcohol to the residue, distilling the mixture, and collecting the fraction rich in methyl acetate.

13. A process of recovering the fatty acid content of aqueous liquids containing such acid in a highly diluted condition, which comprises the steps of adding an alcohol thereto, and esterifying such fatty acid content with the alcohol, in the presence of a condensing agent, and distilling and collecting the ester so formed.

In testimony whereof we affix our signatures in presence of two witnesses.

ANDRÉ HELBRONNER.
GASTON EDOUARD CRIQUEBEUF.

Witnesses:
MAURICE PICARD,
HANSON C. COXE.